(12) United States Patent
Li et al.

(10) Patent No.: US 12,437,475 B1
(45) Date of Patent: Oct. 7, 2025

(54) METHOD AND DEVICE FOR QUANTITATIVELY CHARACTERIZING DEVELOPMENT POSITIONS OF GEOLOGICAL DISASTERS IN SLOPES, AND ELECTRONIC DEVICE

(71) Applicant: Institute of Geology and Geophysics, Chinese Academy of Sciences, Beijing (CN)

(72) Inventors: Yongchao Li, Beijing (CN); Shishu Zhang, Chengdu (CN); Shengwen Qi, Beijing (CN); Yu Zou, Beijing (CN); Songfeng Guo, Beijing (CN); Bowen Zheng, Beijing (CN); Chunling Liu, Beijing (CN); Xinyi Guo, Beijing (CN); Fengjiao Tang, Feicheng (CN); Xiao Lu, Linyi (CN); Xiaokun Hou, Beijing (CN); Zan Wang, Beijing (CN); Jianing Cong, Dalian (CN); Yue Yang, Jiaozuo (CN); Wei Cheng, Kunming (CN); Huyue Zhan, Diqing (CN); Yonghua Yu, Beijing (CN); Naiwu He, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/236,962

(22) Filed: Jun. 12, 2025

(30) Foreign Application Priority Data

Feb. 12, 2025 (CN) .......................... 202510152481.6

(51) Int. Cl.
    *G06T 17/05* (2011.01)
(52) U.S. Cl.
    CPC .................................... *G06T 17/05* (2013.01)
(58) Field of Classification Search
    None
    See application file for complete search history.

(56) References Cited

U.S. PATENT DOCUMENTS

| 8,744,126 B1 * | 6/2014 | Rohrschneider ....... G06V 20/13 |
| | | 382/307 |
| 9,387,938 B1 * | 7/2016 | Vanderkamp ............ G01S 7/22 |

(Continued)

*Primary Examiner* — Jeffrey J Chow (57) ABSTRACT

Provided are a method and device for quantitatively characterizing development positions of geological disasters in slopes, and an electronic device. The method includes: acquiring a slope boundary of a target slope, and constructing a triangle matching the slope boundary, three vertices of the triangle are A, B and C respectively; acquiring, based on the triangle, slope terrain points within a range of triangle; assigning preset attribute information to each slope terrain point $D_i$ of the slope terrain points, the preset attribute information of each slope terrain point $D_i$ at least includes an angle attribute of each slope terrain point $D_i$ and a distance ratio attribute of each slope terrain point $D_i$; and screening out disaster points from the slope terrain points, and plotting and displaying, based on angle attributes and distance ratio attributes of the disaster points, the disaster points in a preset area in a polar coordinate system.

9 Claims, 4 Drawing Sheets

(56) References Cited

U.S. PATENT DOCUMENTS

| | | | |
|---|---|---|---|
| 2007/0280528 A1* | 12/2007 | Wellington | G06V 10/457 |
| | | | 382/154 |
| 2012/0183205 A1* | 7/2012 | Shimamura | G06V 20/13 |
| | | | 382/154 |
| 2015/0331143 A1* | 11/2015 | Han | G01B 11/00 |
| | | | 702/5 |
| 2019/0250291 A1* | 8/2019 | Sun | G06F 17/18 |
| 2022/0012460 A1* | 1/2022 | Yu | G06F 18/217 |
| 2022/0358774 A1* | 11/2022 | Kim | G06V 10/7784 |
| 2023/0099282 A1* | 3/2023 | Tatsuno | G06T 15/08 |
| | | | 382/103 |

* cited by examiner

METHOD AND DEVICE FOR QUANTITATIVELY CHARACTERIZING DEVELOPMENT POSITIONS OF GEOLOGICAL DISASTERS IN SLOPES, AND ELECTRONIC DEVICE

CROSS-REFERENCE TO RELATED APPLICATION

This application claims priority to Chinese patent application No. CN 202510152481.6, filed to China National Intellectual Property Administration (CNIPA) on Feb. 12, 2025, which is herein incorporated by reference in its entirety.

TECHNICAL FIELD

The present disclosure relates to the technical field of geological disasters and environment, and particularly to a method and device for quantitatively characterizing development positions of geological disasters in slopes, and an electronic device.

BACKGROUND

The occurrence of geological disasters in slopes in high mountain canyon areas is closely related to spatial positions of the geological disasters in the slopes. By identifying distribution positions of disasters in the slopes, revealing development patterns of the disasters in the slopes, and identifying positions prone to disasters in the slopes, it is possible to effectively reduce the threat of the geological disasters of the slopes to structures by avoiding or reinforcing the locations prone to disasters in the slopes during the construction of buildings or roads, which is crucial for ensuring the safe construction of projects and the safety of people's lives and property. Current research primarily focuses on longitudinal positions of disasters in slopes, such as elevations of the disasters, head heights of the disasters, and relative heights of the disasters in the slopes, while neglecting transverse positions of the disasters.

Based on this, the present disclosure proposes a method and device for quantitatively characterizing development positions of geological disasters in slopes, and an electronic device.

SUMMARY

Embodiments of the present disclosure provide a method and device for quantitatively characterizing development positions of geological disasters in slopes, and an electronic device, which can be used to address the problem in current geological disaster susceptibility analysis where distribution patterns of disasters along transverse positions of slopes cannot be analyzed, thereby enabling more scientific construction of buildings, roads, and other engineering projects on the slopes.

Technical solutions of the present disclosure are as follows.

In a first aspect, a method for quantitatively characterizing development positions of geological disasters in slopes is provided, which includes: acquiring a slope boundary of a target slope, and constructing a triangle matched with the slope boundary, where three vertices of the triangle are A, B and C, respectively; acquiring, based on the triangle, slope terrain points within a range of the triangle; assigning preset attribute information to each slope terrain point $D_i$ of the slope terrain points, where the preset attribute information of each slope terrain point $D_i$ at least includes an angle attribute of each slope terrain point $D_i$ and a distance ratio attribute of each slope terrain point $D_i$; the angle attribute of each slope terrain point $D_i$ is a target angle value calculated based on an initial angle value of $\angle BAD_i$, and the vertex A is a vertex of the target slope; the distance ratio attribute of each slope terrain point $D_i$ is a distance ratio calculated based on the angle attribute of each slope terrain point $D_i$ and a distance between each slope terrain point $D_i$ and the vertex A; and screening out disaster points from the slope terrain points, and plotting and displaying, based on angle attributes and distance ratio attributes of the disaster points, the disaster points in a preset area in a polar coordinate system.

In an embodiment, a process for calculating the angle attribute of each slope terrain point $D_i$ based on the initial angle value of $\angle BAD_i$ includes: for each slope terrain point $D_i$, calculating the initial angle value of $\angle BAD_i$ defined by each slope terrain point $D_i$, the vertex A, and the vertex B, where the vertex A is the vertex of the target slope, and the vertex B is located to the left of the vertex C; and converting the initial angle value of $\angle BAD_i$ into the target angle value $\alpha$ based on a predetermined transformation coefficient, to thereby obtain the angle attribute of each slope terrain point $D_i$.

In an embodiment, the predetermined transformation coefficient is obtained through the following steps: calculating an angle value of $\angle BAC$ of the triangle; multiplying the angle value of $\angle BAC$ by a coefficient $\varphi$ to obtain a product; and in response to the product being equal to 90°, taking the coefficient $\varphi$ as the predetermined transformation coefficient.

In an embodiment, the converting the initial angle value of $\angle BAD_i$ into the target angle value $\alpha$ based on the predetermined transformation coefficient includes: for each slope terrain point $D_i$, multiplying the initial angle value of $\angle BAD_i$ by the predetermined transformation coefficient and then subtracting 45° to thereby obtain the target angle value $\alpha$ of each slope terrain point $D_i$.

In an embodiment, a process for calculating the distance ratio attribute of each slope terrain point $D_i$ based on the angle attribute of each slope terrain point $D_i$ and the distance between each slope terrain point $D_i$ and the vertex A includes: classifying the slope terrain points into multiple angle classes based on the angle attribute of each slope terrain point $D_i$ and a preset angle interval; for each slope terrain point $D_i$ in each angle class of the multiple angle classes, calculating a distance $L_i$ between each slope terrain point $D_i$ in the angle class and the vertex A, and determining a maximum distance $L_{max}$ among the distance $L_i$ between each slope terrain point $D_i$ in the angle class and the vertex A; and for each slope terrain point $D_i$ in each angle class of the multiple angle classes, determining a ratio $\beta$ of the distance $L_i$ between each slope terrain point $D_i$ in the angle class and the vertex A to the maximum distance $L_{max}$ as the distance ratio attribute of each slope terrain point $D_i$.

In an embodiment, the preset angle interval is 1°, and the slope terrain points are classified into 90 angle classes based on the angle attribute of each slope terrain point $D_i$ and the preset angle interval 1°.

In an embodiment, the screening out disaster points from the slope terrain points includes: acquiring a disaster zone of the target slope, where the disaster zone is a pre-delineated disaster zone within the range of the triangle; extracting disaster information of the slope terrain points within the disaster zone, and assigning the disaster information to a disaster attribute of each slope terrain point $D_i$ in the disaster zone; and screening out, based on the disaster attribute of each slope terrain point $D_i$ in the disaster zone, the disaster points from the slope terrain points.

In an embodiment, the plotting and displaying, based on the angle attributes and the distance ratio attributes of the disaster points, the disaster points in the preset area in the polar coordinate system includes: preconstructing a sector area in the polar coordinate system; using target angle values corresponding to the angle attributes of the disaster points and distance ratios corresponding to the distance ratio attributes of the disaster points as polar angles and polar radii of the disaster points in the polar coordinate system; and plotting and displaying the disaster points within the sector area based on the polar angles and the polar radii of the disaster points.

In a second aspect, a device for quantitatively characterizing development positions of geological disasters in slopes is provided, which includes: a slope boundary acquisition module, configured to acquire a slope boundary of a target slope, and construct a triangle matched with the slope boundary, where three vertices of the triangle are A, B and C, respectively; a terrain point acquisition module, configured to acquire, based on the triangle, slope terrain points within a range of the triangle; an attribute acquisition module, configured to assign preset attribute information to each slope terrain point $D_i$ in the slope terrain points, where the preset attribute information of each slope terrain point $D_i$ at least includes an angle attribute of each slope terrain point $D_i$ and a distance ratio attribute of each slope terrain point $D_i$; the angle attribute of each slope terrain point $D_i$ is a target angle value calculated based on an initial angle value of $\angle BAD_i$, and the vertex A is a vertex of the target slope; the distance ratio attribute of each slope terrain point $D_i$ is a distance ratio calculated based on the angle attribute of each slope terrain point $D_i$ and a distance between each slope terrain point $D_i$ and the vertex A; a disaster point screening module, configured to screen out disaster points from the slope terrain points; and a display module, configured to plot and display, based on angle attributes and distance ratio attributes of the disaster points, the disaster points in a preset area in a polar coordinate system.

In a third aspect, an electronic device is provided, which includes: a processor; and a memory with a computer program stored thereon, where the computer program, when executed by the processor, is configured to implement the method described above.

The technical solutions adopted in the embodiments of the present disclosure can achieve at least the following beneficial effects. In the technical solutions, a target slope in a three-dimensional space is simplified into a triangle in a plane, then slope terrain points within a range of the triangle are acquired. Subsequently, angle attributes and distance ratio attributes are assigned to the slope terrain points, and disaster points are screened out from the slope terrain points. Based on the angle attribute and the distance ratio attribute of the disaster points, a disaster point corresponding to the disaster points is plotted and displayed in a preset area in a polar coordinate system. In other words, the present disclosure uses a target angle value $\alpha$, which is formed by the disaster point and vertices of the triangle, to characterize a transverse position of the disaster point in the target slope. A ratio $\beta$ (i.e., $L_i/L_{max}$, which is a ratio of a distance between the disaster point and the vertex of the triangle to a distance from the vertex to a base boundary in that direction) is used to characterize a longitudinal position of the disaster point in the target slope. Finally, a shape of the target slope is characterized based on a transformation coefficient $\varphi$. Thus, a spatial position of the geological disaster in the target slope is represented by ($\varphi$, $\alpha$, $\beta$). The present disclosure can address the problem in current geological disaster susceptibility analysis where distribution patterns of disasters along transverse positions of slopes cannot be analyzed, thereby enabling more scientific construction of buildings, roads, and other engineering projects on the slopes.

BRIEF DESCRIPTION OF DRAWINGS

Accompanying drawings described herein are provided to further illustrate the present disclosure and constitute a part thereof. The illustrative embodiments and their descriptions in the present disclosure are intended to explain the present disclosure and do not constitute any undue limitation thereof.

DETAILED DESCRIPTION OF EMBODIMENTS

The present disclosure proposes a method and device for quantitatively characterizing development positions of geological disasters in slopes, and an electronic device. To make the objectives, technical solutions, and advantages of the present disclosure clearer, the technical solutions of the present disclosure will be described in a clear and comprehensive manner below in conjunction with specific embodiments of the present disclosure and the corresponding accompanying drawings. Apparently, the described embodiments are merely a part of embodiments of the present disclosure, rather than all of them. Based on the described embodiments of the present disclosure, all other embodiments obtained by those of ordinary skill in the art without creative efforts shall fall within the scope of protection of the present disclosure.

Figure 1:
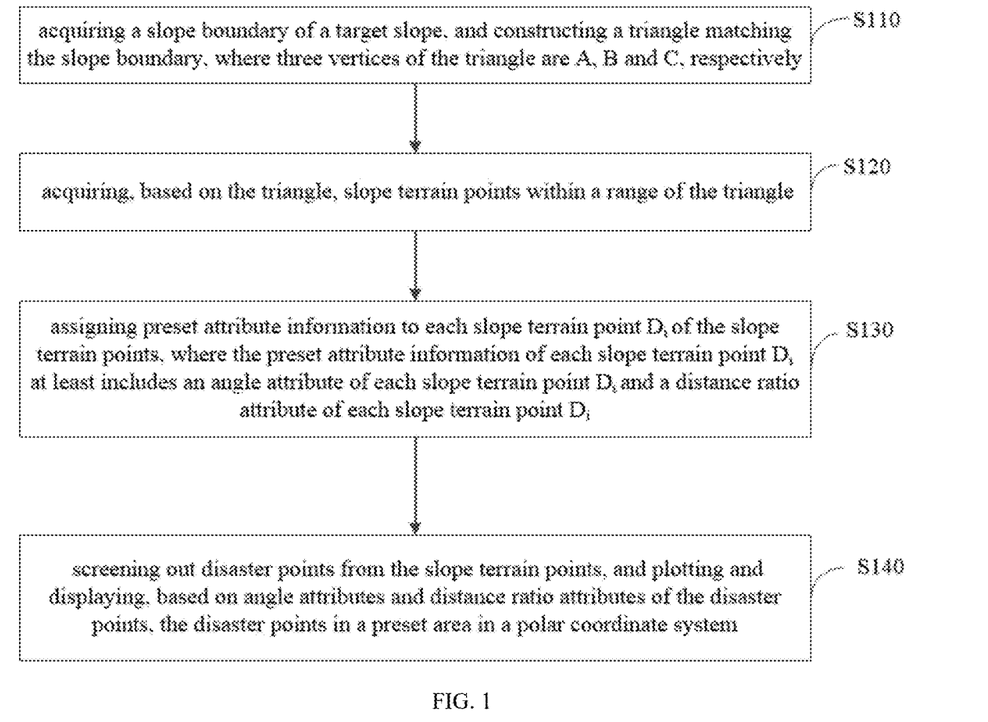
FIG. 1 illustrates a flowchart of a method for quantitatively characterizing development positions of geological disasters in slopes according to an embodiment of the present disclosure.

First, referring to FIG. 1, FIG. 1 illustrates a flowchart of a method for quantitatively characterizing development positions of geological disasters in slopes according to an embodiment of the present disclosure. The method includes steps S110 through S140.

In step S110, a slope boundary of a target slope is obtained, and a triangle matched with the slope boundary is constructed, where three vertices of the triangle are A, B, and C respectively.

Figure 2:
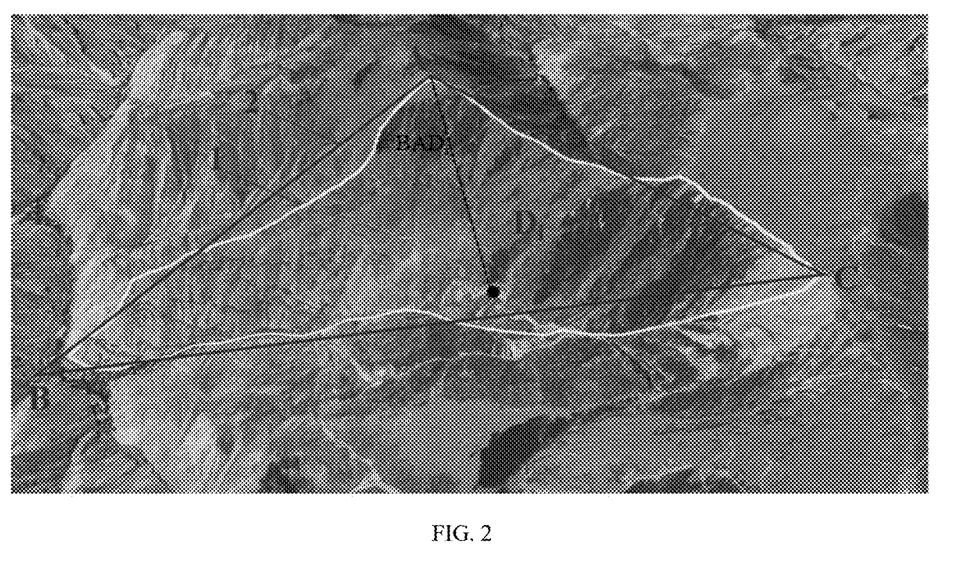
FIG. 2 illustrates a schematic diagram of a target slope in a triangular range obtained by generalizing a target slope based on a remote sensing image according to an embodiment of the present disclosure.

For the target slope, an image of the target slope can be obtained based on remote sensing image, and a slope range of the target slope can then be manually delineated within the image of the target slope. In this way, the slope boundary of the target slope can be obtained directly, that is, a shape of the target slope can be obtained. Subsequently, the target slope is generalized as the triangle. Specifically, the triangle is constructed based on the shape of the target slope, so that three sides of the triangle coincide with the slope boundary as much as possible, that is, the triangle matching the slope boundary is constructed, and the three vertices of the triangle are A, B and C respectively. Referring to FIG. 2, FIG. 2 illustrates a schematic diagram of a target slope in a triangular range obtained by generalizing a target slope based on remote sensing image according to an embodiment of the present disclosure. As shown in FIG. 2, the slope boundary (i.e., a boundary range 1 in FIG. 2) of the target slope is first outlined using the remote sensing image. A triangle 2 is then drawn based on the boundary range 1, and three sides of the triangle substantially coincide with the boundary range 1, thereby obtaining the triangle that matches the slope boundary. The vertex A of the triangle is a vertex of the target slope, and the vertex B of the triangle is located to the left of the vertex C. After obtaining the generalized triangle, it is enough to keep the target slope within the triangle.

In step S120, slope terrain points within a range of the triangle are acquired based on the triangle.

In step S120, the constructed triangle is taken as a boundary of the target slope, and a triangular shape of the target slope is obtained. As an example, based on the triangular shape of the target slope, an arc geographic information system (ArcGIS®) software can be used to cut a digital elevation model of the target slope to get a triangle-shaped slope terrain file named "slope terrain. tif", and then the "slope terrain. tif" file can be converted into slope terrain points named "slope point. shp" by using a raster conversion function of the ArcGIS® software. Those skilled in the art can also obtain the slope terrain points of the triangle-shaped target slope in other ways, which is not specifically limited in the present disclosure.

In step S130, preset attribute information is assigned to each slope terrain point $D_i$ of the slope terrain points, where the preset attribute information of each slope terrain point $D_i$ at least includes an angle attribute of each slope terrain point $D_i$ and a distance ratio attribute of each slope terrain point $D_i$.

As an example, multiple attributes can be assigned to each slope terrain point $D_i$, which can include an X attribute, a Y attribute, a Z attribute, a JD attribute, a JD2 attribute, a JDL attribute, a JL attribute, and a JLB attribute. The X attribute is used to store an X-axis coordinate value. The Y attribute is used to store a Y-axis coordinate value. The Z attribute is used to store a Z-axis coordinate value (i.e., elevation). The JD attribute is used to store an initial angle value. The JD2 attribute is used to store a target angle value. The JDL attribute is used to store an angle class. The JL attribute is used to store a vertex distance. The JLB attribute is used to store a distance ratio. For an X-axis coordinate value, a Y-axis coordinate value, and a Z-axis coordinate value of each slope terrain point $D_i$, the technicians in this field can choose a suitable way to calculate them. For example, the technicians in this field can directly calculate the X-axis coordinate value and Y-axis coordinate value of each slope terrain point $D_i$ by using a computational geometry function of the ArcGIS® software, and extract elevation information contained in "slope terrain. tif" by using the "Extract Multi Values to Points" function, that is, the Z-axis coordinate value, and add the X-axis coordinate value, the Y-axis coordinate value and the Z-axis coordinate value to the X attribute, the Y attribute and the Z attribute of slope terrain point $D_i$. This embodiment does not specifically limit how to acquire the X attribute, the Y attribute and the Z attribute.

In step S130, the angle attribute refers to the aforementioned JD2 attribute, which is a target angle value calculated based on an angle defined by each slope terrain point $D_i$ and the vertices A and B. As an example, when calculating the angle attribute, for each slope terrain point $D_i$, each initial angle value $\alpha'$ of $\angle BAD_i$ defined by each slope terrain point $D_i$ and the vertices A and B is first calculated. Then, each initial angle value $\alpha'$ is converted into each target angle value $\alpha$ using a predetermined transformation coefficient to obtain the angle attribute of each slope terrain point $D_i$. The initial angle value $\alpha'$ is stored in the JD attribute, and the target angle value $\alpha$ is stored in the angle attribute (i.e., the JD2 attribute). The predetermined transformation coefficient is obtained as follows: calculating an angle value of $\angle BAC$ of the triangle, multiplying the angle value of $\angle BAC$ by a coefficient $\varphi$ to obtain a product; and in response to the product being equal to 90°, taking the coefficient $\varphi$ as the predetermined transformation coefficient. In other words, before calculating the target angle value, the angle value of $\angle BAC$ is first calculated, and then the angle value of <BAC is multiplied by the coefficient $\varphi$ to convert the angle value of $\angle BAC$ into 90°. Subsequently, the initial angle value $\alpha'$ of $\angle BAD_i$ is calculated, and the target angle value is determined as $\alpha = \varphi \times \alpha'$. Finally, the target angle value $\alpha$ is taken as the angle attribute (i.e., JD2 attribute) corresponding to each slope terrain point $D_i$.

In an embodiment, a process for converting each initial angle value into a corresponding target angle value using the predetermined transformation coefficient includes: for each slope terrain point $D_i$, its initial angle value is multiplied by the predetermined transformation coefficient and then reduced by 45° to obtain the target angle value $\alpha$. That is, in this embodiment, $\alpha = \varphi \times \alpha' - 45°$. Then, the target angle value $\alpha$ is taken as the angle attribute (i.e., JD2 attribute) corresponding to each slope terrain point $D_i$. This design improves the visualization of disaster points in the final results, as explained later.

In step S130, the distance ratio attribute refers to the aforementioned JLB attribute, which is a distance ratio calculated based on distance data between each slope terrain point $D_i$ and the vertex A. As an example, a process for calculating the distance ratio includes the following steps.

Firstly, based on the angle attribute of each slope terrain point $D_i$, the slope terrain points are divided into multiple angle classes according to a preset angle interval.

Specifically, the preset angle interval can be set to 1°. That is, slope terrain points with a target angle value in a range of [−45, −44) are classified into a first category, slope terrain points with a target angle value in a range of [−44, −43) are classified into a second category, slope terrain points with a target angle value in a range of [−43, −42) are classified into a third category, and so on, resulting in a total of 90 angle classes. The classification value for each slope terrain point $D_i$ is stored in the aforementioned JDL attribute. In this example, classification follows the ranges [−45, −44), [−44, −43), [−43, −42), etc., where the target angle value $\alpha$ is calculated using the formula $\alpha = \varphi \times \alpha' - 45°$.

Secondly, for each slope terrain point $D_i$ in each angle class, a distance $L_i$ between each slope terrain point $D_i$ in the angle class and the vertex A is calculated, and a maximum distance $L_{max}$ among the distance $L_i$ between each slope terrain point $D_i$ in the angle class and the vertex A is determined.

In S32, as an example, a Euclidean distance formula can be used to: based on the X and Y coordinates of each slope terrain point $D_i$, calculate the distance $L_i$ between each slope terrain point $D_i$ in the angle class and the vertex A. This distance $L_i$ can be stored in the JL attribute corresponding to the slope terrain point $D_i$. For each angle class, the maximum distance $L_{max}$ among the distance $L_i$ between each slope terrain point $D_i$ in this angle class and the vertex A is determined. This embodiment does not impose specific limitations on how to calculate the distance from the slope terrain point $D_i$ to the vertex A, and an algorithm can be chosen based on practical needs. The Euclidean distance formula will not be elaborated herein.

Thirdly, for each slope terrain point $D_i$ in each angle class, a ratio β of the distance $L_i$ between each slope terrain point $D_i$ in the angle class and the vertex A to the maximum distance $L_{max}$ is taken as the distance ratio attribute of the slope terrain point $D_i$.

Specifically, as an example, after calculating the distance $L_i$ between each slope terrain point $D_i$ in the angle class and the vertex A, the distance ratio $β=L_i/L_{max}$ is calculated based on the angle class to which the slope terrain point $D_i$ belongs. Here, $L_i$ represents a distance between a current slope terrain point $D_i$ and the vertex A, and $L_{max}$ represents a maximum distance among distances between all slope terrain points in the angle class to which the current slope terrain point $D_i$ belongs and the vertex A. The calculated distance ratio β is stored in the distance ratio attribute (i.e., JLB attribute).

In summary, this embodiment primarily involves assigning the angle attribute and distance ratio attribute corresponding to each slope terrain point $D_i$. In the above example, assigning multiple attributes to each slope terrain point $D_i$ facilitates the calculation of its angle and distance ratio attributes.

In step S140, disaster points are screened out from the slope terrain points, and based on the angle attributes and the distance ratio attributes of the disaster points, the disaster points are plotted and displayed in a preset area in a polar coordinate system.

In the step S140, a process for screening out the disaster points from the slope terrain points may include the following steps.

Firstly, a disaster zone of the target slope is acquired, where the disaster zone is a pre-delineated disaster zone within the triangle.

As an example, after a corresponding target slope image is obtained based on a remote sensing image, the disaster zone in the target slope image can be delineated. Referring to FIG. 2, A range of the target slope is circled in FIG. 2. Similarly, the disaster zone within the target slope can be circled again. Based on the remote sensing image, the disaster zone of the target slope can be clearly seen. One way for determining the disaster zone can be manual circle drawing, which is not described in detail here.

Secondly, disaster information of the slope terrain points within the disaster zone is extracted, and the disaster information is assigned to a disaster attribute of each slope terrain point $D_i$ in the disaster zone.

Specifically, in addition to the previously assigned attributes, a ZH attribute (i.e., disaster attribute) can be assigned to each slope terrain point $D_i$. As an example, the disaster zone obtained above can be converted into a raster file named "disaster zone.tif" using the "Polygon to Raster" function of the ArcGIS® software, with a raster value set to 1. The information from "disaster zone.tif" is then extracted into the ZH attribute of the corresponding slope terrain point $D_i$. This means that, among all slope terrain points, slope terrain points $D_i$ with the ZH attribute value of 1 are disaster points, while slope terrain points $D_i$ with the ZH attribute value other than 1 are non-disaster points.

Thirdly, based on the disaster attribute of each slope terrain point $D_i$ in the disaster zone, the disaster points are screened out from the slope terrain points.

Thus, through the above steps in step S140, the disaster points can be screened out from the slope terrain points.

Furthermore, in step S140, after the disaster points are screened out, a process for plotting and displaying the disaster points in the preset area in the polar coordinate system based on the angle attributes and the distance ratio attributes of the disaster points includes: preconstructing a sector area in the polar coordinate system; using target angle values corresponding to the angle attributes of the disaster points and distance ratios corresponding to the distance ratio attributes of the disaster points as polar angles and polar radii of the disaster points in the polar coordinate system; and plotting and displaying the disaster points within the sector area based on the polar angles and the polar radii of the disaster points.

Figure 3:
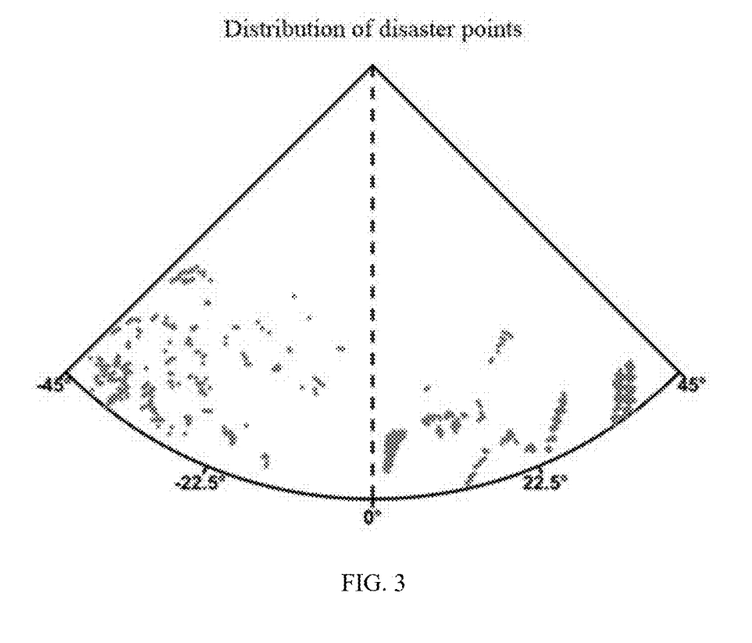
FIG. 3 illustrates the distribution display of disaster points according to an embodiment of the present disclosure.

As an example, a drawing software can be used to select a polar coordinate system and draw a sector in a two-dimensional space with a vertex angle of 90° and a radius of 1 to represent a slope in space. The screened disaster points are exported and saved as a "disaster points.dbf" file. Then, α values corresponding to the angle attribute and β values corresponding to the distance ratio attribute in the "disaster points.dbf" file as the polar angles and the polar radii of the disaster points in the polar coordinate system. The polar angles and the polar radii of the disaster points are sequentially into the drawing software to plot and display the disaster points within the sector. It should be noted that when calculating the angle attribute earlier, the initial angle value is multiplied by the transformation coefficient and then reduced by 45°. As a result, the final displayed effect is shown in FIG. 3. If it is not reduced by 45°, the displayed sector area may appear as the sector area in FIG. 3 rotated by 45° counterclockwise or clockwise.

In an embodiment, the method further includes: using (φ, α, β) to represent a spatial position of a geological disaster in the target slope, and constructing, by a building engineer, a building or a road in a region around the target slope to make the building and the road keep away from the spatial position of the geological disaster in the target slope, to thereby effectively reduce threat of the geological disaster in the target slope to the building or the road.

In an embodiment, the method further includes: based on positions of the disaster points in the preset area in the polar coordinate system, constructing, by a building engineer, a building or a road in a region around the target slope to make the building and the road keep away from the spatial position of the geological disaster in the target slope to thereby effectively reduce threat of the geological disaster in the target slope to the building or the road.

In an embodiment, the method further includes: based on positions of the disaster points in the preset area in the polar coordinate system, reinforcing, by a building engineer, the target slope, to thereby effectively reduce threat of the geological disaster in the target slope to buildings or roads around the target slope.

In an embodiment, the method further includes: determining, based on positions of the disaster points in the preset area in the polar coordinate system, high-risk areas of disasters in the target slope; and constructing, by a building engineer, a building or a road in a region around the target slope to make the building and the road keep away from the high-risk areas of disasters in the target slope to thereby effectively reduce threat of the geological disaster in the target slope to the building or the road.

In an embodiment, the method further includes: installing alarm devices at positions of the disaster points in the target slope, where each of the alarm devices includes an alarm sounder, an ultrasonic sensor, and a processor electrically connected to the alarm sounder and the ultrasonic sensor; and in response to the ultrasonic sensor detecting a signal indicating personnel passing through a corresponding one of the positions of the disaster points in the target slope, controlling, by the processor, the alarm sounder to emit an alarm sound to remind the personal to leave the corresponding one of the positions of the disaster points in the target slope.

Figure 4:
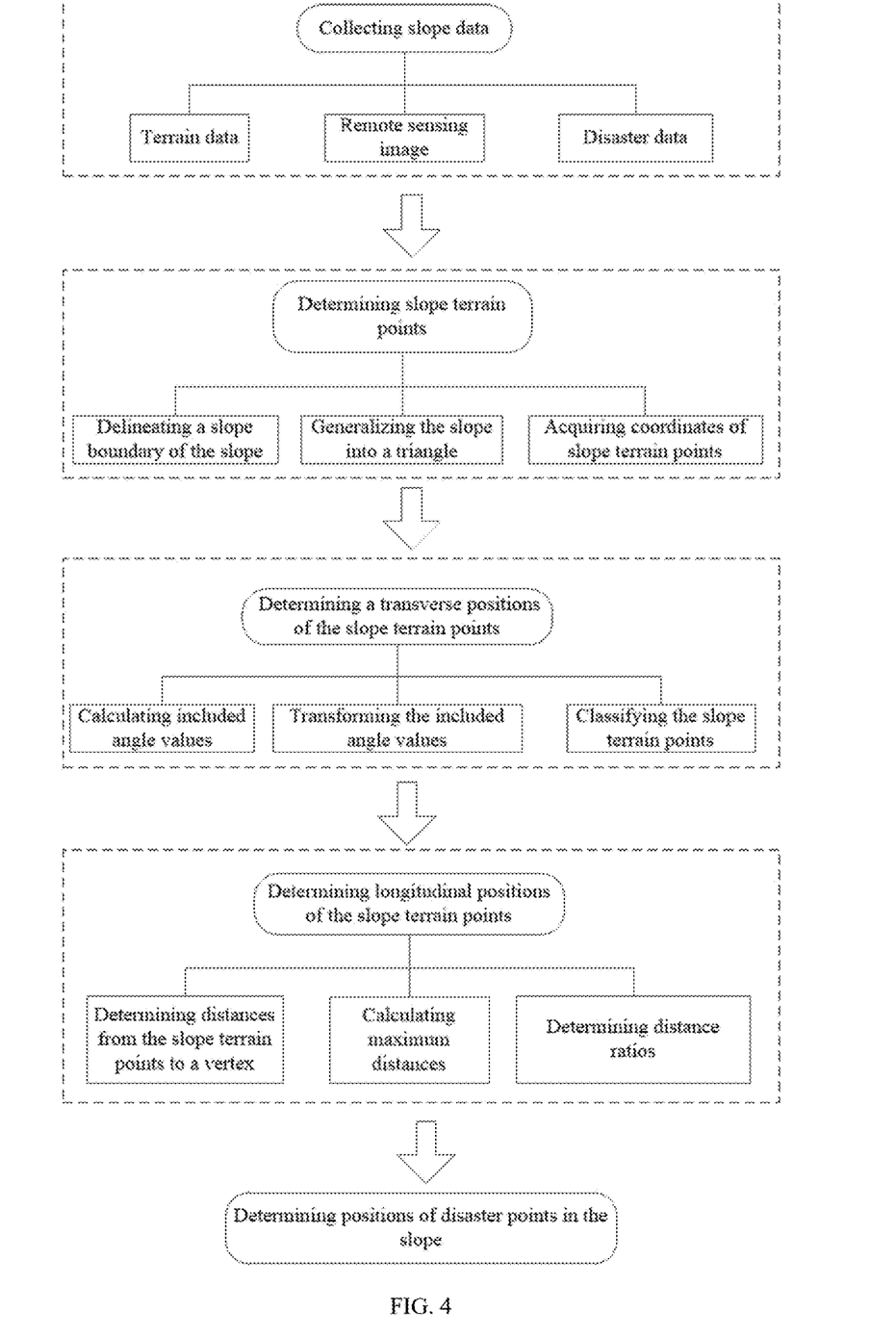
FIG. 4 illustrates a framework diagram of a specific implementation of a method for quantitatively characterizing development positions of geological disasters in slopes according to an embodiment of the present disclosure.

Referring to FIG. 4, FIG. 4 illustrates a framework diagram of a specific implementation of a method for quantitatively characterizing development positions of geological disasters in slopes according to an embodiment of the present disclosure. As shown in FIG. 4, an inventive concept of the present disclosure mainly includes: collecting slope data, determining slope terrain points, determining transverse positions of the slope terrain points, and determining longitudinal positions of the slope terrain points. The slope data includes: terrain data, a remote sensing image, and disaster data. The determining slope terrain point includes: delineating a slope boundary of the slope, generalizing the slope into a triangle, and acquiring coordinates of slope terrain points. The determining transverse positions of the slope terrain points includes calculating included angle values, transforming the included angle values, and classifying the slope terrain points. The determining longitudinal positions of the slope terrain points includes: determining distances from the slope terrain points to a vertex, calculating maximum distances, and determining distance ratios. Finally, positions of disaster points in the slope are determined. This embodiment will not be described in further detail herein, please refer to the detailed explanation above. Those skilled in the art will understand that the method of the present disclosure does not limit the execution order of specific steps and can be optimized based on actual computational needs.

Figure 5:
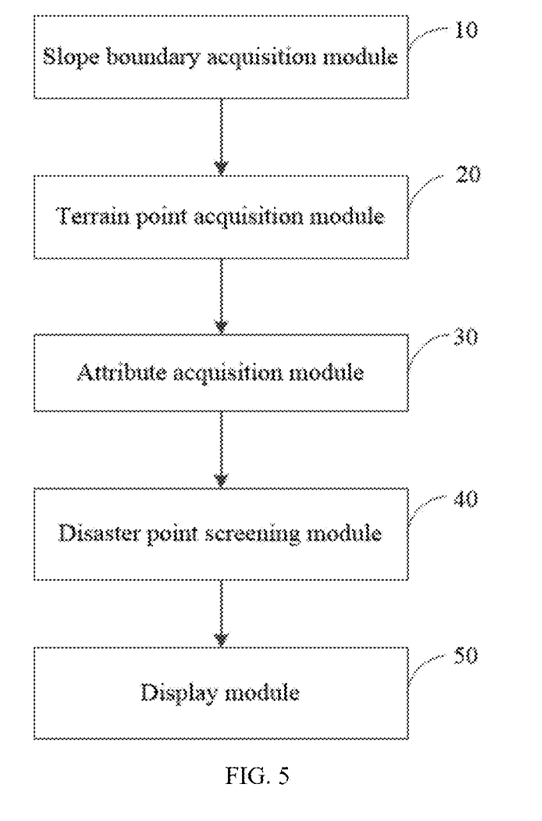
FIG. 5 illustrates a schematic diagram of a device for quantitatively characterizing development positions of geological disasters in slopes according to an embodiment of the present disclosure.

The present disclosure also provides a device for quantitatively characterizing development positions of geological disasters in slopes. As shown in FIG. 5, the device includes: a slope boundary acquisition module 10, a terrain point acquisition module 20, an attribute acquisition module 30, a disaster point screening module 40, and a display module 50.

The slope boundary acquisition module 10 is configured to acquire a slope boundary of a target slope, and construct a triangle matched with the slope boundary, where three vertices of the triangle are A, B and C, respectively.

The terrain point acquisition module 20 is configured to acquire, based on the triangle, slope terrain points within a range of the triangle.

The attribute acquisition module 30 is configured to: assign preset attribute information to each slope terrain point $D_i$ in the slope terrain points, where the preset attribute information of each slope terrain point $D_i$ at least includes an angle attribute of each slope terrain point $D_i$ and a distance ratio attribute of each slope terrain point $D_i$; the angle attribute of each slope terrain point $D_i$ is a target angle value calculated based on an initial angle value of $\angle BAD_i$, and the vertex A is a vertex of the target slope; the distance ratio attribute of each slope terrain point $D_i$ is a distance ratio calculated based on the angle attribute of each slope terrain point $D_i$ and a distance between each slope terrain point $D_i$ and the vertex A.

The disaster point screening module 40 is configured to screen out disaster points from the slope terrain point.

The display module 50 is configured to plot and display, based on angle attributes and distance ratio attributes of the disaster points, the disaster points in a preset area in a polar coordinate system.

For specific implementation details of the device, please refer to the method description above, which will not be repeated herein. Those skilled in the art will understand that the device of the present disclosure does not limit the execution order of specific steps and can be optimized based on actual computational needs.

In an embodiment, each of the slope boundary acquisition module 10, the terrain point acquisition module 20, the attribute acquisition module 30, the disaster point screening module 40, and the display module 50 is embodied by at least one processor and at least one memory coupled to the at least one processor, and the at least one memory stores computer programs executable by the at least one processor.

The present disclosure also provides an electronic device, which includes: a processor; and a memory with a computer program stored thereon, where the computer program, when executed by the processor, is configured to implement the method described above.

In summary, the present disclosure provides a method and device for quantitatively characterizing development positions of geological disasters in slopes, and an electronic device. In the technical solutions, a target slope in a three-dimensional space is simplified into a triangle in a plane, then slope terrain points within a range of the triangle are acquired. Subsequently, angle attributes and distance ratio attributes are assigned to the slope terrain points, and disaster points are screened out from the slope terrain points. Based on the angle attribute and the distance ratio attribute of the disaster points, a disaster point corresponding to the disaster points is plotted and displayed in a preset area in a polar coordinate system. In other words, the present disclosure uses a target angle value $\alpha$, which is formed by the disaster point and vertices of the triangle, to characterize a transverse position of the disaster point in the target slope. A ratio $\beta$ (i.e., $L_i/L_{max}$, which is a ratio of a distance between the disaster point and the vertex of the triangle to a distance from the vertex to a base boundary in that direction) is used to characterize a longitudinal position of the disaster point in the target slope. Finally, a shape of the target slope is characterized based on a transformation coefficient $\varphi$. Thus, a spatial position of the geological disaster in the target slope is represented by $(\varphi, \alpha, \beta)$. The present disclosure can address the problem in current geological disaster susceptibility analysis where distribution patterns of disasters along transverse positions of slopes cannot be analyzed, thereby enabling more scientific construction of buildings, roads, and other engineering projects on the slopes.

The above describes specific embodiments of the present disclosure, while other embodiments fall within the scope of the appended claims. In some cases, the actions or steps described in the claims may be performed in an order different from that in the embodiments while still achieving the desired results. Similar or identical parts between the embodiments in this specification may be cross-referenced, with each embodiment focusing on its differences from others.

The above descriptions are merely illustrative of the embodiments of the present disclosure and are not intended to limit the scope of the application. For those skilled in the art, various modifications and changes may be made to the present disclosure. Any amendments, equivalent substitutions, or improvements made within the spirit and principles of the present disclosure shall be included within the scope of the claims.

What is claimed is:

1. A method for quantitatively characterizing development positions of geological disasters in slopes, the method comprising:

acquiring a slope boundary of a target slope, and constructing a triangle matched with the slope boundary, wherein three vertices of the triangle are A, B, and C, respectively;

acquiring, based on the triangle, slope terrain points within a range of the triangle;

assigning preset attribute information to each slope terrain point $D_i$ of the slope terrain points, wherein the preset attribute information of each slope terrain point $D_i$ at least comprises an angle attribute of each slope terrain point $D_i$ and a distance ratio attribute of each slope terrain point $D_i$; the angle attribute of each slope terrain point $D_i$ is a target angle value calculated based on an initial angle value of $\angle BAD_i$, and the vertex A is a vertex of the target slope; the distance ratio attribute of each slope terrain point $D_i$ is a distance ratio calculated based on the angle attribute of each slope terrain point $D_i$ and a distance between each slope terrain point $D_i$ and the vertex A; and screening out disaster points from the slope terrain points, and plotting and displaying, based on angle attributes and distance ratio attributes of the disaster points, the disaster points in a preset area in a polar coordinate system;

wherein a process for calculating the distance ratio attribute of each slope terrain point $D_i$ based on the angle attribute of each slope terrain point $D_i$ and the distance between each slope terrain point $D_i$ and the vertex A comprises:

classifying the slope terrain points into multiple angle classes based on the angle attribute of each slope terrain point $D_i$ and a preset angle interval;

for each slope terrain point $D_i$ in each angle class of the multiple angle classes, calculating a distance $L_i$ between each slope terrain point $D_i$ in the angle class and the vertex A, and determining a maximum distance $L_{max}$ among the distance $L_i$ between each slope terrain point $D_i$ in the angle class and the vertex A; and for each slope terrain point $D_i$ in each angle class of the multiple angle classes, determining a ratio β of the distance $L_i$ between each slope terrain point $D_i$ in the angle class and the vertex A to the maximum distance $L_{max}$ as the distance ratio attribute of each slope terrain point $D_i$.

2. The method as claimed in claim 1, wherein a process for calculating the angle attribute of each slope terrain point $D_i$ based on the initial angle value of $\angle BAD_i$ comprises:

for each slope terrain point $D_i$, calculating the initial angle value of $\angle BAD_i$ defined by each slope terrain point $D_i$, the vertex A, and the vertex B, wherein the vertex A is the vertex of the target slope, and the vertex B is located to the left of the vertex C; and converting the initial angle value of $\angle BAD_i$ into the target angle value α based on a predetermined transformation coefficient, to thereby obtain the angle attribute of each slope terrain point $D_i$.

3. The method as claimed in claim 2, wherein the predetermined transformation coefficient is obtained through the following steps:

calculating an angle value of $\angle BAC$ of the triangle;

multiplying the angle value of $\angle BAC$ by a coefficient φ to obtain a product; and in response to the product being equal to 90°, taking the coefficient φ as the predetermined transformation coefficient.

4. The method as claimed in claim 3, wherein the converting the initial angle value of $\angle BAD_i$ into the target angle value α based on the predetermined transformation coefficient comprises:

for each slope terrain point $D_i$, multiplying the initial angle value of $\angle BAD_i$ by the predetermined transformation coefficient and then subtracting 45° to thereby obtain the target angle value α of each slope terrain point $D_i$.

5. The method as claimed in claim 2, wherein the preset angle interval is 1°, and the slope terrain points are classified into 90 angle classes based on the angle attribute of each slope terrain point $D_i$ and the preset angle interval 1°.

6. The method as claimed in claim 2, wherein the screening out disaster points from the slope terrain points comprises:

acquiring a disaster zone of the target slope, wherein the disaster zone is a pre-delineated disaster zone within the range of the triangle;

extracting disaster information of the slope terrain points within the disaster zone, and assigning the disaster information to a disaster attribute of each slope terrain point $D_i$ in the disaster zone; and screening out, based on the disaster attribute of each slope terrain point $D_i$ in the disaster zone, the disaster points from the slope terrain points.

7. The method as claimed in claim 6, wherein the plotting and displaying, based on the angle attributes and the distance ratio attributes of the disaster points, the disaster points in the preset area in the polar coordinate system comprises:

preconstructing a sector area in the polar coordinate system;

using target angle values corresponding to the angle attributes of the disaster points and distance ratios corresponding to the distance ratio attributes of the disaster points as polar angles and polar radii of the disaster points in the polar coordinate system; and plotting and displaying the disaster points within the sector area based on the polar angles and the polar radii of the disaster points.

8. A device for quantitatively characterizing development positions of geological disasters in slopes, the device comprising:

a slope boundary acquisition module, configured to acquire a slope boundary of a target slope, and construct a triangle matched with the slope boundary, wherein three vertices of the triangle are A, B, and C, respectively;

a terrain point acquisition module, configured to acquire, based on the triangle, slope terrain points within a range of the triangle;

an attribute acquisition module, configured to assign preset attribute information to each slope terrain point $D_i$ in the slope terrain points, wherein the preset attribute information of each slope terrain point $D_i$ at least comprises an angle attribute of each slope terrain point $D_i$ and a distance ratio attribute of each slope terrain point $D_i$; the angle attribute of each slope terrain point $D_i$ is a target angle value calculated based on an initial angle value of $\angle BAD_i$, and the vertex A is a vertex of the target slope; the distance ratio attribute of each slope terrain point $D_i$ is a distance ratio calculated based on the angle attribute of each slope terrain point $D_i$ and a distance between each slope terrain point $D_i$ and the vertex A;

a disaster point screening module, configured to screen out disaster points from the slope terrain points; and a display module, configured to plot and display, based on angle attributes and distance ratio attributes of the disaster points, the disaster points in a preset area in a polar coordinate system;

wherein a process for calculating the distance ratio attribute of each slope terrain point $D_i$ based on the angle attribute of each slope terrain point $D_i$ and the distance between each slope terrain point $D_i$ and the vertex A comprises:

classifying the slope terrain points into multiple angle classes based on the angle attribute of each slope terrain point $D_i$ and a preset angle interval;

for each slope terrain point $D_i$ in each of the multiple angle classes, calculating a distance $L_i$ between each slope terrain point $D_i$ in each of the multiple angle classes and the vertex A, and determining a maximum distance $L_{max}$ among the distance $L_i$ between each slope terrain point $D_i$ in each of the multiple angle classes and the vertex A; and for each slope terrain point $D_i$ in each of the multiple angle classes, determining a ratio $\beta$ of the distance $L_i$ between each slope terrain point $D_i$ in each of the multiple angle classes and the vertex A to the maximum distance $L_{max}$ among the distance $L_i$ between each slope terrain point $D_i$ in each of the multiple angle classes and the vertex A as the distance ratio attribute of each slope terrain point $D_i$.

9. An electronic device, comprising:

a processor; and a memory with a computer program stored thereon, wherein the computer program, when executed by the processor, is configured to implement the method as claimed in claim 1.

* * * * *